Sept. 29, 1936.   R. L. MULLER   2,055,550
CALCULATING MACHINE
Original Filed Oct. 13, 1933   6 Sheets-Sheet 1

INVENTOR
Robert L. Muller
BY
Rector, Hibben, Davis & Macauley
ATTORNEYS

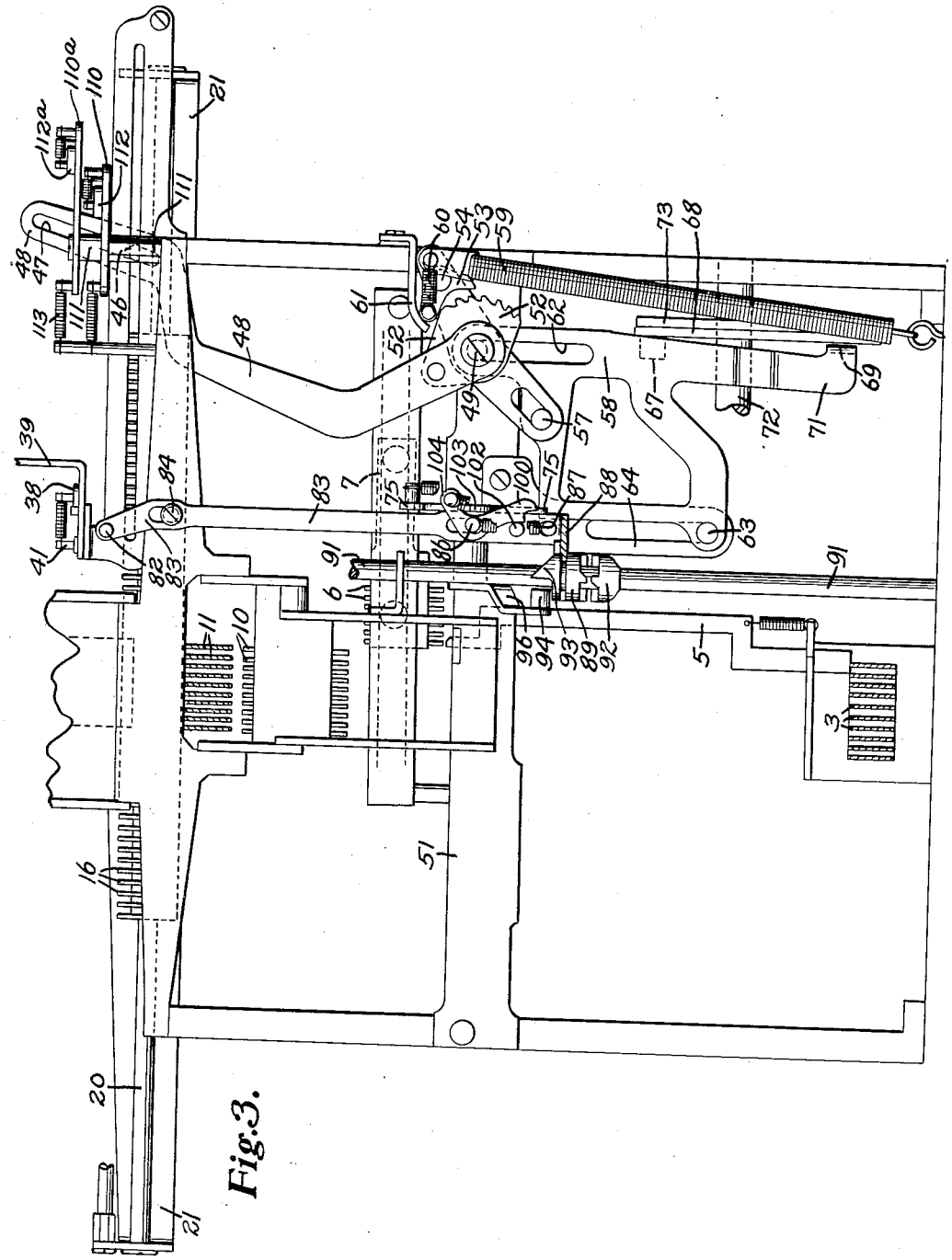

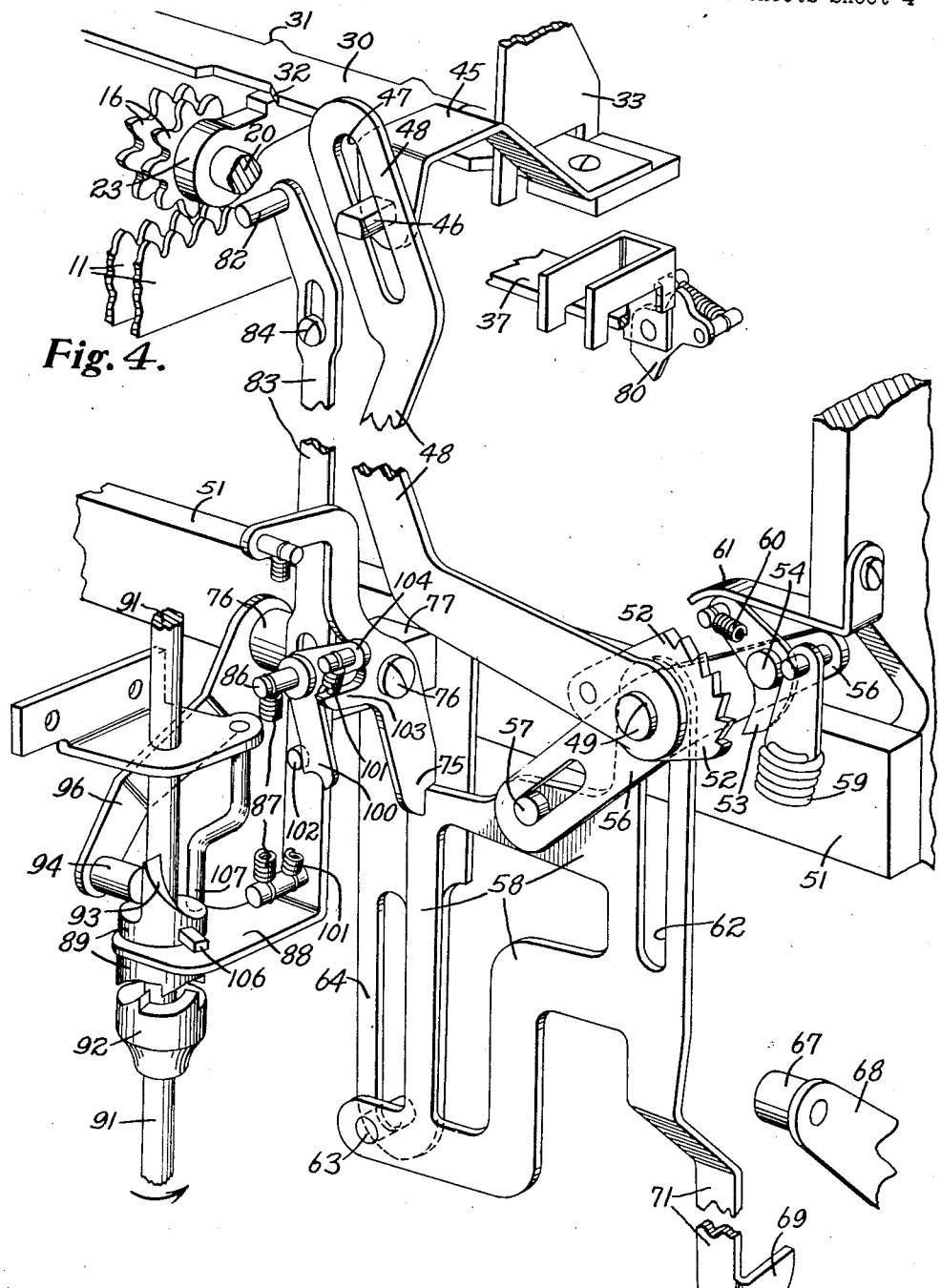

Sept. 29, 1936.   R. L. MULLER   2,055,550
CALCULATING MACHINE
Original Filed Oct. 13, 1933   6 Sheets-Sheet 5
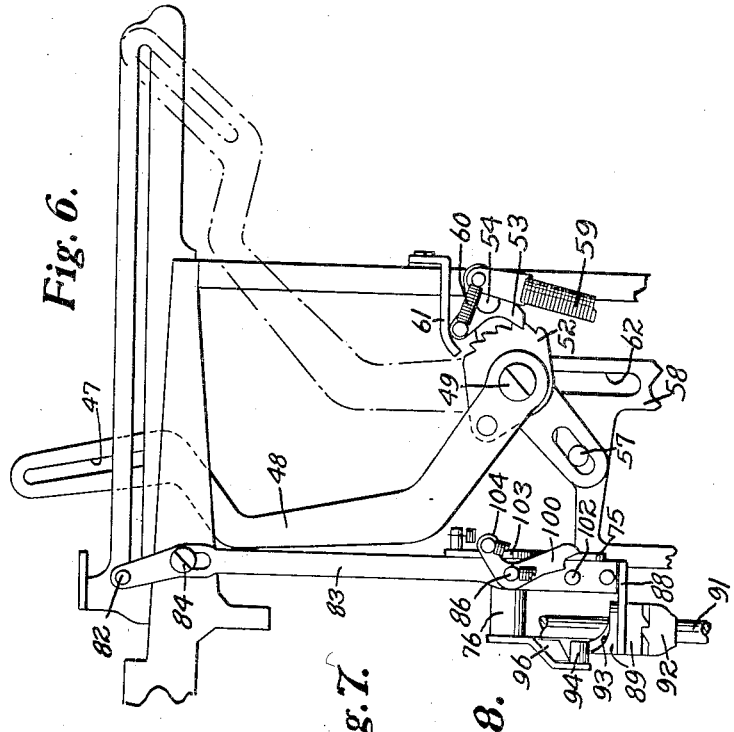
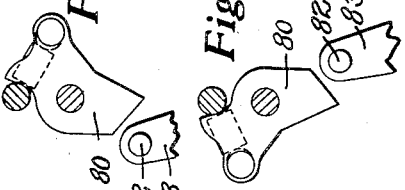
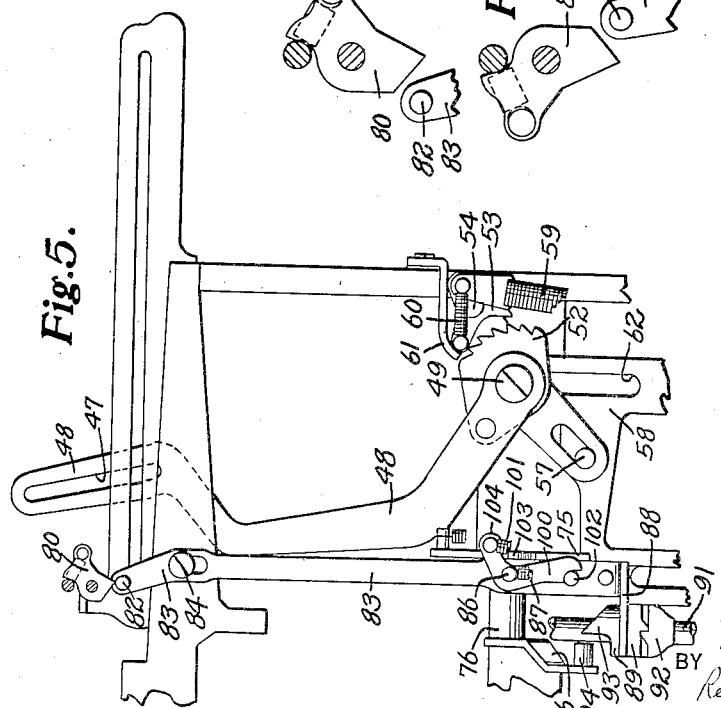
INVENTOR
Robert L. Muller
BY
Rector, Hibben, Davis & Macauley
ATTORNEYS Sept. 29, 1936.　　　R. L. MULLER　　　2,055,550
CALCULATING MACHINE
Original Filed Oct. 13, 1933　　6 Sheets-Sheet 6

INVENTOR
Robert L. Muller
BY
Rector, Hibben, Davis & Macauley
ATTORNEYS

Patented Sept. 29, 1936

2,055,550

UNITED STATES PATENT OFFICE 2,055,550

CALCULATING MACHINE

Robert L. Muller, Detroit, Mich., assignor to Burroughs Adding Machine Company, Detroit, Mich., a corporation of Michigan Application October 13, 1933, Serial No. 693,410
Renewed September 25, 1935

36 Claims. (Cl. 235—60)

This invention relates to calculating machines and is directed more particularly to a multiple register machine and concerns the register selecting and restoring mechanism therefor.

The general object of this invention is to provide an improved selecting and/or restoring mechanism for multiple register calculating machines.

A more particular object is to provide an improved selecting mechanism for multiple register calculating machines which is automatic in operation to variably select any of the registers for any columnar position of the paper carriage in a successive series of columnar positions and/or in an irregular series of columnar positions.

Other objects and advantages of the invention will appear from the specification and drawings which illustrate one embodiment of the invention and in which, Figure 1 is a right side elevation of a calculating machine illustrating the principal elements of the invention, certain elements of the calculating machine being omitted to illustrate more readily the features of this invention;

Fig. 3 is a partial front elevation taken on line 3—3 of Fig. 1 and illustrating the register frame and controls therefor;

Fig. 4 is a partial perspective view from the front and right side of the machine showing the control mechanism for the register frame;

Fig. 5 is a front elevation of a portion of the mechanism shown in Fig. 3 and illustrating the parts in condition when a pawl of the traveling paper carriage engages the register restoring mechanism prior to release of the restoring mechanism;

Fig. 6 is a view similar to Fig. 5 illustrating the parts after release of the register restoring mechanism but before the registers have been restored;

Figs. 7 and 8 are detail front views illustrating the possible reversed positions of the release pawl used for releasing the register restoring mechanism in certain columnar positions of the carriage.

General calculating machine structure

The invention is shown applied to a Burroughs calculating machine of the type shown in the Hopkins Patent No. 1,336,904, issued April 13, 1920. Machines of this type embody a typewriter mechanism as well as a calculating mechanism.

Figure 1:
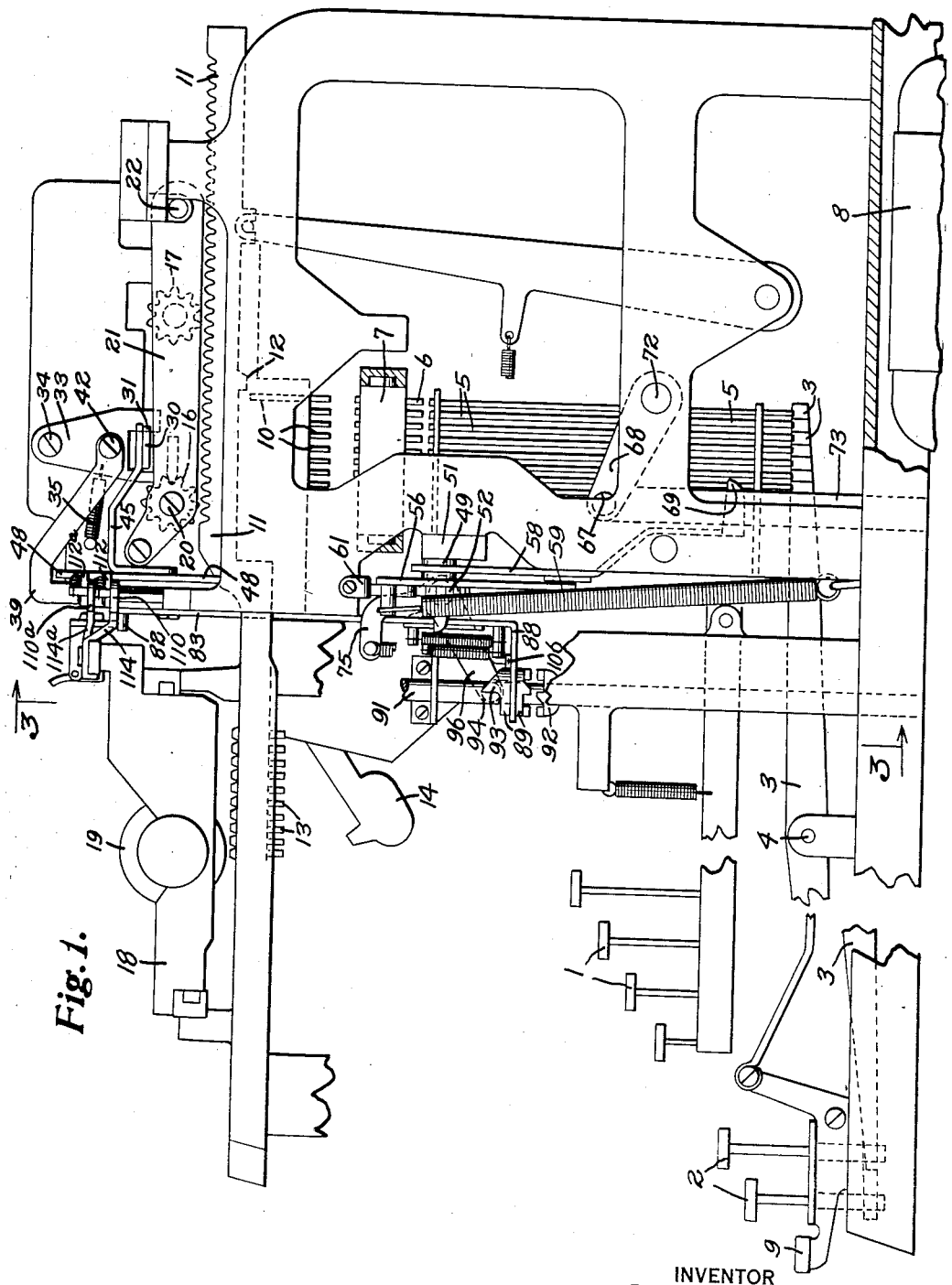

The typewriter mechanism has not been illustrated in detail but is operated by suitable type keys 1 (Fig. 1) which operate the usual type bars (not shown) which imprint upon paper passed beneath a platen.

The calculating mechanism is of the ten-key type and includes ten digit or amount keys 2 representing digits from 0 to 9, inclusive. The digit keys 2 are connected to key levers 3 pivoted at 4 and have their rear ends positioned under vertically movable index bars 5 which when raised by depression of keys 2 move pins 6 in a movable pin carriage 7. Pins 6 are arranged in a plurality of rows, the different rows corresponding to the different orders of the machine, such as units, tens, hundreds, etc. The pin carriage is urged to the left as viewed from the front of the machine and its lateral movement is under the control of an escapement mechanism so that the pin carriage will move one space to the left after each digit key has been depressed and released.

The escapement mechanism is preferably of the type shown in the heretofore-mentioned Hopkins patent or similar to that shown in the Thieme Patent No. 1,143,240.

After the pins have been set up in the pin carriage the machine is given a cycle of operation by energizing the driving or operating motor 8, controlled by a motor bar 9. During operation the pin carriage 7 is raised to bring its pins 6 into engagement with the vertically movable pins 10 in the stationary field of pins which pins are thereby set up by the pins in the traveling pin carriage.

The pins in the stationary field act as stops for a plurality of actuator racks 11 which have stop lugs 12 on them adapted to engage any of the pins 10 that may be projected upwardly. The rack bars are normally held in rearward position but during the forward stroke of operation of the machine are released to assume the forward position permitted by pins 10.

The rack bars 11 carry type 13 upon their front ends and after the rack bars have been differentially positioned a printing mechanism including hammers 14 is operated to print the item that has been entered.

Front and rear registers 16 and 17 are provided in the machine and are moved into and out of engagement with the actuator racks 11 at appropriate times to perform calculating functions such as addition, totaling, sub-totaling, transfer of totals, etc. Mechanism for moving these registers into and out of engagement with the racks has not been illustrated in detail here but is disclosed in the heretofore-mentioned Hopkins patent. This mechanism includes suitable controls to enable either the front or the rear or both registers to be engaged with the rack bars during addition operations so that items may be added in either register or in both registers simultaneously. These controls are well known in the art and are shown in detail in the Hopkins patent and in the Thieme Patent No. 1,321,260.

The machine is provided with a traveling paper carriage 18 supporting a platen 19. The carriage is tabulated laterally across the machine from right to left as viewed from the front under the control of a tabulating mechanism such as disclosed in the Thieme Patent No. 1,259,929, and may be returned by power by mechanism such as disclosed in the Thieme Patent No. 1,120,862, the power in this case being the driving motor 8.

For a more detailed description of the construction and operation of this machine and the various mechanisms heretofore mentioned, reference is made to the aforementioned Hopkins and Thieme patents.

Multiple register assembly

The front register 16 contains sixty register wheels divided into six sections (Fig. 2) or individual registers $R_1$, $R_2$, $R_3$, $R_4$, $R_5$, $R_6$ of ten register wheels each, all slidingly mounted upon a common shaft 20 carried by arms 21, pivoted at 22 to the rear of the machine. The six registers comprising the sixty register wheels are retained and moved along the common shaft 20 by a frame 23 also slidably supported on shaft 20. The entire register assembly consisting of frame 23 and the six registers are constantly urged to the left by a coil spring 27, one end of which is attached to the arm 21 and the other end of which is attached at 28 to the register frame 23. Controls are provided to position the register frame so that any one of the six registers may be placed in active position with respect to the actuator racks as will now be explained. It will be understood, of course, that although sixty register pinions are shown this number may be varied.

Multiple register control

The register frame is constantly urged to the left by spring 27 and therefore it is only necessary to release the register frame at certain intervals to permit movement thereof and to stop movement of the register frame and registers therein at desired positions to index a selected register in proper position to be brought into active relation with the racks 11. For controlling movement of the register frame a stop bar 30 (Figs. 2 and 4) is attached to the frame, which bar contains a number of alternately arranged rearward projections or lugs 31 and forward projections 32 which are engaged by a stop pawl 33 (Figs. 1 and 2), pivoted at 34 to the frame of the machine. Pawl 33 is bifurcated at its lower end which end straddles bar 30, with the rear leg engaging the rearwardly projecting lugs 31 of bar 30 or the front leg engaging forwardly projecting lugs 32 formed on bar 30. Pawl 33 is urged in a clockwise direction by a spring 35 so that its rearward leg is normally in contact with one of the lugs 31 to position the register frame with one of the registers in proper active relation to the racks 11.

Figure 2:
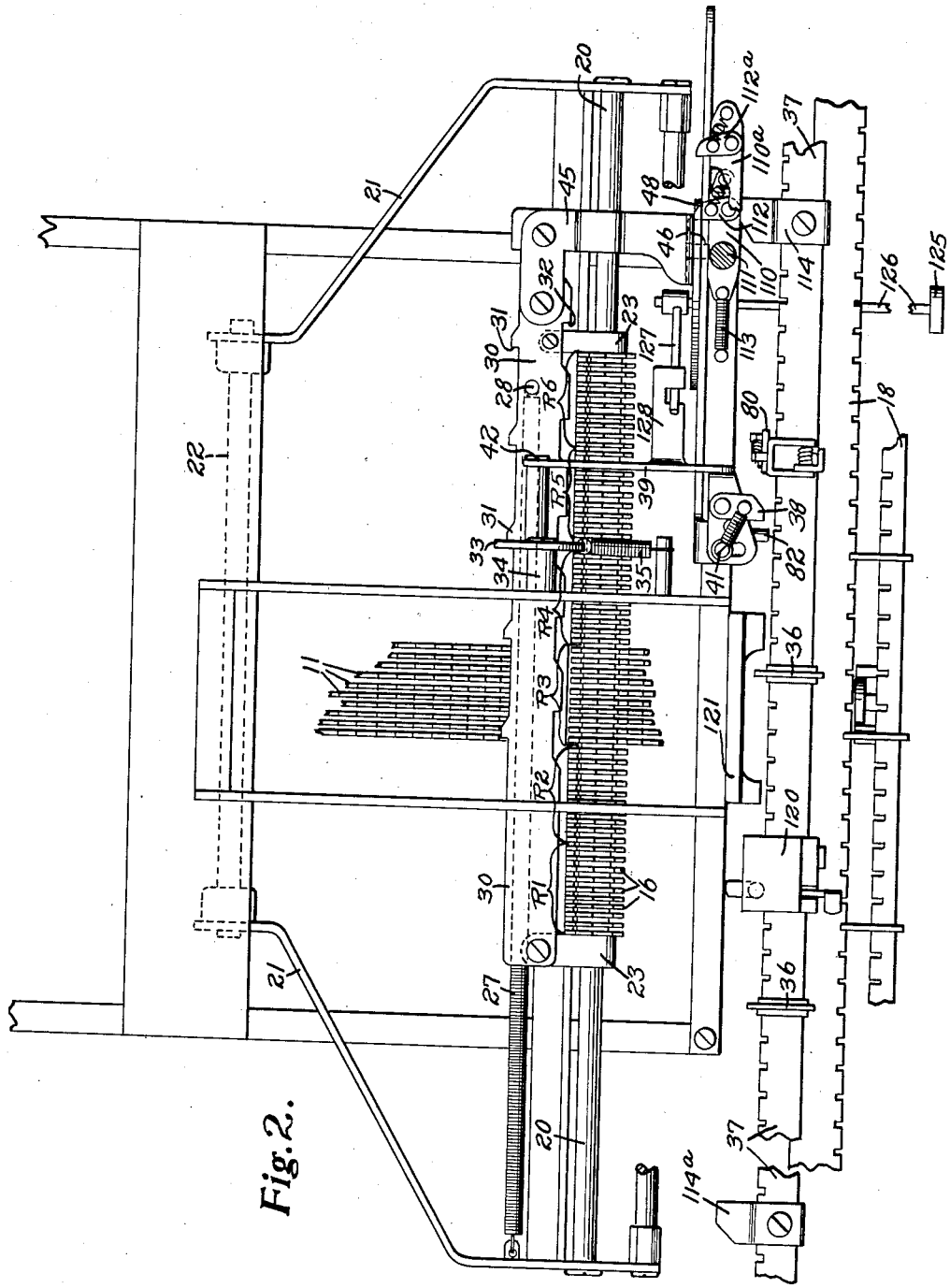
Fig. 2 is a partial plan view illustrating particularly the laterally moving register frame with its registers therein and the associated controls for the register frame.

In Fig. 2 the register frame is shown in position with the third or $R_3$ register disposed over rack bars 11. The spacing of lugs 31 and 32 is such that upon a complete oscillation of stop pawl 33 the register frame moves a distance equal to one register. That is, in the normal position of pawl 33 its rearward leg engages one of the rearwardly projecting lugs 31. Upon counterclockwise rotation of stop pawl 33 the rearward leg thereof clears lug 31 and its forward leg engages a forwardly projecting lug 32 which is disposed midway between lugs 31 and 32 and momentarily prevents the stop bar from moving more than approximately half the distance of one register. Upon return or clockwise movement of pawl 33 the forward leg thereof clears the lug 32 and the rearward leg engages the next rearwardly projecting lug 31 of the leftwardly moving register frame, there being a lug 31 for each register. It follows from the foregoing that upon each complete escapement, i. e., oscillation, comprising a counterclockwise rotation and then clockwise rotation of pawl 33, the register frame is permitted to move a distance to the left equal to one register. Means are provided for controlling this movement of the register from the paper carriage as will now be explained.

Paper carriage control of register frame

The traveling paper carriage 18 which supports the platen 19 is normally urged to the left as viewed from the front of the machine and is under control of the usual carriage escapement mechanism as previously explained. The carriage 18 is also automatically tabulated into certain columnar positions so that figures may be printed in certain columns on the form or work sheet. As the carriage is tabulated into the various columnar positions release dogs 36 (Fig. 2) adjustably secured to by the carriage bar 37 engage a pass-by pawl 38 carried by an arm 39 (Figs. 1 and 2) the forward end of which is supported by a stud and slot connection 41 to the stationary frame of the machine, and the rearward end of which is pivoted about a horizontal pivot 42 to pawl 33.

It follows, therefore, that as the paper carriage is tabulated to its columnar positions dogs 36 contact pawl 38 to move arm 39 on its pin and slot connection 41 which in turn oscillates pawl 33 about its pivot 34 due to the pivotal connection 42 between arm 39 and stop pawl 33. Accordingly, the register frame is permitted to move a distance equal to one register to the left each time a carriage release dog 36 engages pass-by pawl 38 and causes a full rearward and return movement of the pawl 33. When the carriage is returned to the right either manually or through power means, the pass-by pawl 38 permits passage of dogs 36 without operating release pawl 33.

Restoring of registers

After the paper carriage has been tabulated to its full position to the left as viewed from the front and whether or not the register frame has been released or tabulated to its full left position, in which position register $R_6$ is in proper position over the rack bars, the paper carriage can be returned automatically by motor power or manually by hand if desired, as previously stated. At this time it may be desirable to return the register frame to its No. 1 position or partially return it to some other selected position in order that other entries may be printed on the paper form in proper columnar position with a different register in active position in each columnar position during a second tabulation of the paper carriage.

It is preferable that the register frame be restored under control of the paper carriage but by independent means in order that the register frame may be partially returned instead of fully returned and/or moved to some position other than the No. 1 position with the paper carriage in the first columnar position. Furthermore, it is desirable to have an independent restoring means for the register frame in order that the movement of the register frame may be independent of the distance moved by the paper carriage so that movement of the register frame is not limited by the width of the columnar position of the paper carriage or the corresponding column width of the paper form or work sheet being used.

One of the difficulties in previous machines in which the selection of the registers was controlled directly from the paper carriage by direct connections between the paper carriage and register frame was that the amount of movement in short tabulations of the paper carriage was not sufficient to permit the register frame to be moved because the space occupied by the columns of the form was not equal to the distance traveled by the register frame. That is, if the columns were very narrow they would be less than the width of a register on the register frame and consequently the registers could not be indexed under such conditions.

Accordingly, in the present invention entirely independent means is provided for restoring the register frame although the return of the paper carriage is utilized to control the mechanism for restoring the register frame. This enables the register frame to be moved either manually or automatically into its various register positions without regard to the position or location of the traveling paper carriage. This construction also enables the register frame to be automatically restored at any time during ordinary tabulations of the paper carriage instead of requiring a complete tabulation and return of the carriage prior to restoration of the register frame. In other words, the register frame can be completely and/or partially restored upon a complete tabulation of the paper carriage and/or the register may be completely or partially restored upon a mere partial tabulation of the traveling paper carriage. Consequently an automatic variable selection of the registers is possible to move a selected register into active position in a predetermined columnar position of the carriage during one entry in said column and to move another selected register or the same register into active position during a second entry in said column regardless of whether the second entry in the said column follows immediately the first entry return or not. Restating, upon a second or third transaction in the same columnar position, the same or different registers may automatically be moved into proper position relatively to the rack bars because of the independence of the register frame from the paper carriage although the former may be controlled from the latter.

Accordingly, the register frame 23 is provided with a forwardly extending arm 45 (Figs. 1 and 2) having a stud 46 on its forward edge (Figs. 2 and 4) which engages in a slot 47 formed in the upper end of an arm 48 pivoted at 49 to the cross member 51 (Fig. 3) of the machine. Fixed to the pivoted end of arm 48 is a toothed sector 52 engaged under certain conditions by a pawl 53 pivoted at 54 to a lever 56 also pivoted at 49 to the frame of the machine and having at its other end a stud and slot connection 57 with a vertical slide 58. Lever 56 is normally urged clockwise (Fig. 4) by a tension spring 59 through which spring and connection 57 it tends to raise slide 58. Slide 58 is normally latched against the action of spring 59 as will hereinafter appear. Pawl 53 is constantly urged toward sector 52 by a spring 60 which tends to rotate pawl 53 clockwise about its pivot 54 and to force the upper end of the pawl into engagement with a shelf 61 secured to the machine frame. Shelf 61 cams pawl 53 out of engagement with sector 52 until lever 56 is rocked clockwise about its pivot by spring 59 as will be explained hereafter.

Slide 58 has a slotted connection 62 with pivot pin 49 and an additional pin and slot connection 63 with a brace 64 depending from the machine frame 51 which connections insure vertical sliding movement of slide 58. When slide 58 is permitted to move upwardly and allow clockwise rotation of lever 56, pawl 53 will move downwardly away from shelf 61 and into engagement with the toothed sector 52 (Fig. 6), whereas downward movement of slide 58 rocks lever 56 counterclockwise against the action of spring 59 and retracts pawl 53 out of engagement with sector 52. Slide 58 is lowered against the action of spring 59 by a stud 67 (Figs. 1, 3, and 4) carried upon the end of an arm 68 in position to engage a laterally bent lug 69 formed upon a depending finger 71 of slide 58. Arm 68 is rigidly secured to the main driving shaft 72 of the machine (Fig. 1) which is oscillated at each machine operation through a link 73 connected to the main driving motor 8. At the same time lever 56 is restored releasing pawl 53 from sector 52. The lowering of slide 58 and the restoring of lever 56 will again tension spring 59 in preparation for the next register restoring operation. It will be understood that spring 59 is tensioned during each and every operation of the machine regardless of whether a register restoring operation has occurred or not.

After the register frame has been restored it is held in a number 1 or $R_1$ register position until the following machine operation. The register restoring mechanism may act to restore the register frame from any one of its intermediate register positions as will be explained later.

Slide 58 is latched in its lowered position by a latch arm 75 secured to a shaft 76 journaled in a block 77 fastened to the brace 64 of the machine frame. Under certain conditions as will now be explained latch 75 is released at the proper time to permit upward movement of slide 58 and a consequent restoring operation of the register frame. That is, upward movement of slide 58 permits engagement of pawl 53 with sector 52 and accordingly rocks lever 48 clockwise which through its stud and slot connection 46—47 with the forwardly projecting arm 45 of the register frame 30, restores the register frame to the right. The amount of movement of the register frame depends upon which tooth of sector 52 is engaged by pawl 53, which, of course, will depend upon the position of lever 48 and its sector 52 when pawl 53 is moved into engagement with the sector. That is, if the register frame is in sixth position and lever 48 is correspondingly in mid-position as shown in Fig. 4, pawl 53 will engage the sixth or lowest tooth of sector 52 to return the register frame to its first or home position, other conditions permitting.

Paper carriage control of register restoration

For fully automatic operation latch 75 is placed under control of the paper carriage. For this purpose a release pawl 80 is adjustably secured to bar 37 (Fig. 4) of the paper carriage and is so positioned that upon lateral movement of the paper carriage it will engage a stud 82 carried upon the upper end of a vertical link 83 guided for limited vertical movement by stud and slot connections 84 and 86 to the machine frame. Link 83 is constantly urged in upward direction by a spring 87. The lower end of link 83 is formed with a laterally projecting portion 88 which engages in a groove in a clutch member 89 slidingly carried by vertical shaft 91 of the carriage return mechanism well known in this type of machine and shown in the heretofore mentioned patents. Shaft 91 is constantly rotated by the driving motor and is used to return the paper carriage. The driving motor 8 is thus utilized through shaft 91 to operate latch 75 through clutch 89 in the following manner: Fixed to shaft 91 for rotation therewith is a second clutch member 92 engageable by the clutch member 89 when the latter is in its lower position. This position of clutch member 89 is assumed when release pawl 80 engages stud 82 and forces link 83 downwardly as shown in Figs. 5 and 6, in this position clutch member 89 is driven from clutch member 92.

Clutch member 89 is formed with an upwardly projecting cam 93 which, upon counterclockwise rotation of clutch member 89 when driven by shaft 91 engages a stud 94 carried by the lower end of an arm 96 fixed to a shaft 76 which extends through block 77 and to which latch 75 is secured. From the foregoing it will be apparent that release pawl 80 by engagement of stud 82 lowers link 83 which causes engagement of the clutch members 89 and 92 (Fig. 5) which in turn causes arm 96 to be rocked clockwise because of the rotation of shaft 91 (Fig. 6), whereupon latch 75 releases slide 58. Slide 58 is raised by spring 59 through arm 56 which in rocking clockwise causes pawl 53 to engage rack 52 (Fig. 6) which rocks lever 48 clockwise to restore the register frame.

In view of the fact that the engagement of release pawl 80 with stud 82 is only momentary as the paper carriage passes between columns, it is necessary to provide an additional latch for retaining link 83 in lowered position. Accordingly, a latch 100 is pivoted to pin 86 and is normally urged clockwise into active position by spring 101 to cause its notched end to engage a stud 102 projecting from link 83. Latch 100 is released by latch 75 the latter having a forwardly projecting finger 103 which upon clockwise rotation of latch 75 engages an arm 104 of latch 100 to rock the latter counterclockwise to released position.

To prevent rotation of the clutch member 89 when it is in its raised position it is provided with a laterally projecting stud 106 which when the clutch member is in upper position engages a rod 107 fixed to a portion of the machine frame. When clutch member 89 is in lowered position stud 106 clears rod 107 and permits rotation of the clutch member.

From the foregoing description it will be apparent that inasmuch as link 83 performs no work it may be lowered with very little energy and accordingly practically no load is placed upon the paper carriage because of its lowering the link 83. On the other hand due to the frictional resistance to movement of latch 75 because of the pressure of slide 58 thereagainst, more energy is necessary to move latch 75. This movement, however, is accomplished by the carriage return shaft 91 driven from the main driving motor 8, consequently no additional load is placed upon the paper carriage.

Partial restoration of register frame

It is desirable at times to restore the register frame only part way rather than the full distance to the first or $R_1$ register position. For example, it may be desirable to restore the register frame from the last or $R_6$ register position to one of the center or $R_3$ register position and accordingly provision is made in the present invention to permit such a partial restoration of the register frame.

Accordingly, arms 110 and 110ª (Fig. 2) are pivoted at 111 intermediate their ends to the machine frame. At their outer ends these arms carry pass-by pawls 112 and 112ª respectively, which pawls project inwardly in position to engage lever 48 under certain conditions. Arms 110 and 110ª are maintained in longitudinal position relatively to the machine frame by springs 113 and 113ª secured to the frame and to one end of the arms. At the proper positions, depending upon how far it is desired to partially restore the register frame at each instance, blocks 114 and 114ª are secured to the bar 37 of the paper carriage. These blocks project inwardly at different planes and engage arms 110 and 110ª to prevent pivotal retraction thereof about their pivots 111, thus retaining pawls 112 and 112ª in position to engage lever 48 and prevent further return of this lever and of the register frame. Only two arms and pawls are shown in Fig. 2 but if it is desired to partially restore the register frame selectively to more than two positions additional arms 110, pawls 112 and blocks 114 may be incorporated as indicated at 114ᵇ and 114ᶜ in Fig. 9. A release pawl 80 is, of course, used to start the register frame in restoring direction by engaging stud 82 to lower link 83 and release latch 75 after which the register frame is partially restored while the carriage comes to rest, that is, the register is restored until lever 48 is retained by engagement with a pawl 112 rendered effective by and depending upon the location of blocks 114 and 114ª along the carriage bar 37.

Partial return of paper carriage

After an entry has been completed in the last column of the form, it is sometimes desirable to return the paper carriage only part way to some intermediate columnar position instead of all of the way to column 1. To provide for this the usual marginal block 120 (Fig. 2) is secured to the carriage bar 37 and in the illustrated embodiment is so positioned that the carriage will be returned to column 7. Block 120 extends rearwardly sufficiently to engage a stop 121 in the well-known manner of this type of machine to release the carriage return mechanism which returns the carriage to the desired column, in this case, column 7.

Total taking

Provision is made in the present machine so that with the carriage located in one columnar position and the register in the first or $R_1$ register position, a total may be taken of the $R_1$ register or of any of the registers by releasing the register frame permitting it to travel to the left to the desired register. For this purpose a manual release button 125 (Fig. 2) is provided which is connected by shaft 126 and pin 127 to an extension 128 of release lever 39 whereby depression of button 125 will rock release lever 39 rearwardly thus releasing the register frame to tabulate it one register position to the left. Accordingly, repeated depressions of button 125 will bring any desired register to totaling position. This feature of being able to take a total from any register of the group of registers with the paper carriage in one position is possible because of the independence of the register from the paper carriage.

In this connection it will be remembered that the first machine operation after the register frame has been restored to columnar 1 position restores slide 58 to its normal position and releases the contact of pawl 53 with sector 52, thus freeing the register frame so that it may be moved either to the right or to the left.

*Operation of machine*

Figure 9:
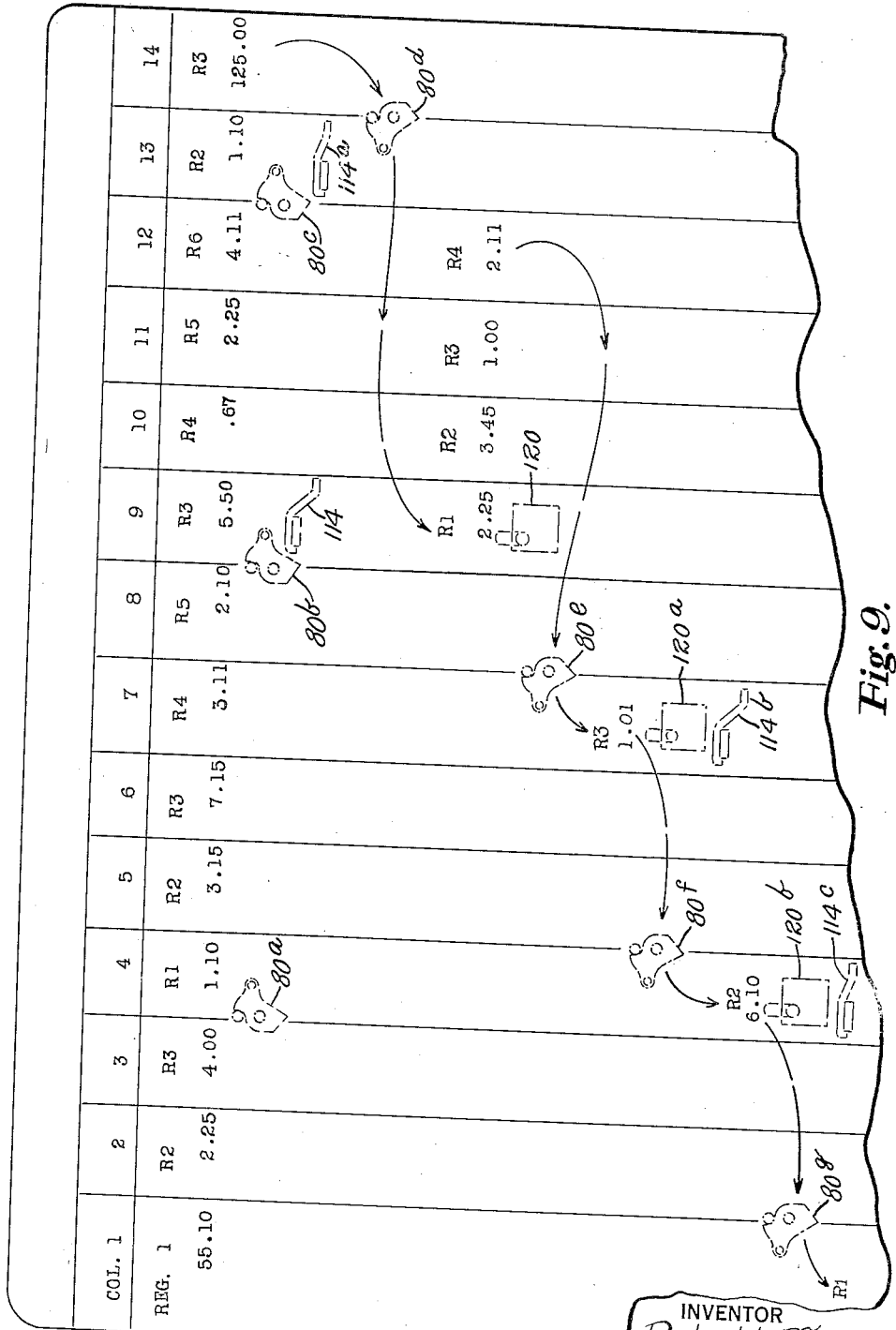
Fig. 9 is a sample form illustrating one use of the invention.

The operation of the machine is believed to be apparent from the foregoing description but will be summarized in connection with a sample form or record sheet as shown in Fig. 9, although it will be understood that this sheet is only one of many forms and arrangements that may be used. The sample form or record sheet shown in Fig. 9 contains fourteen vertical columns and the paper carriage tubulating mechanism is so set that the paper carriage will be tabulated successively into the fourteen columnar positions corresponding to the vertical columns of the form so that items can be printed on the form in consecutive manner from column 1 to column 14, and repeated in the illustrated form through several columns.

In the present machine the register frame and associated mechanism is so set that when the paper carriage is in column 1 the register frame is set with its first register $R_1$ in operative relation to the type bars of the machine, this setting having been automatically made from the previous return of the carriage, i. e., the release pawl 80 having been located on the traveling paper carriage in position to release the register restoring mechanism during the time the carriage is being returned, the relative position of this release pawl being indicated on the form as 80ᶜ. The exact position may be varied considerably so long as it releases the register frame during the return of the carriage.

With the carriage located in the first column and the $R_1$ register in active position a total may be taken of this register if desired as previously explained.

Assuming ordinary operation of the machine, however, to enter items in successive columns of the form, after an amount has been set up on the keyboard for column 1 the motor bar is depressed to cause the machine to take a stroke of operation during which time the amount will be printed on the form in column 1 and will also be entered in the $R_1$ register. As the machine completes a stroke of operation the carriage is automatically tabulated to the left into column 2 position during which tabulation dog 36 (Fig. 2) will actuate release pawl 33 through pass-by pawl 38 to bring the $R_2$ register into active position with the racks. An amount is then entered in the machine and added into register $R_2$ after which the carriage is automatically tabulated to column 3. Successive operations of the machine may then be made to enter items into the successive columns. It will be understood that a dog 36 is placed on bar 37 between each columnar position on the form in order to release the register frame to move one register position to the left under the urge of spring 27.

In the present or illustrated form, however, successive registers are not used in successive columnar positions. Instead of register $R_4$ being used in the fourth columnar position the register frame is restored to bring the register $R_1$ into active position. Therefore, instead of placing a release dog 36 to release the register frame a release pawl 80 is positioned on the traveling paper carriage so as to engage stud 82 to release the register restoring mechanism and restore the register frame to initial or No. 1 position. The relative position of this pawl 80 is indicated on the form at 80ᵃ. It will be understood that this pawl 80ᵃ is reversed as is shown in Fig. 7 relatively to the normal position shown in Fig. 8, which position is used in restoring the register mechanism to first position at the full return of the paper carriage because the carriage is moving in the opposite direction to that assumed in Fig. 8.

From the column 4 position the machine is given successive strokes of operation until the paper carriage reaches column 8. During tabulations from column 4 to column 8 the register frame is stepped successively from $R_1$ register position to $R_5$ register position. In going into column 9 position it is desired to partially return the register frame to bring register $R_3$ into active position in column 10. For this purpose another release pawl 80 is positioned on the carriage frame just prior to the column 9 position so that before the carriage finally reaches column 9 position the register frame is started in restored direction. The position of this pawl is shown at 80ᵇ in Fig. 9 and is similar to 80ᵃ. At the same position it is also necessary to place a stop 114 as indicated in Fig. 9 to prevent complete restoration of the register frame to $R_1$ position. This stop block 114 limits the restoring movement of arm 48 so that the third register $R_3$ is brought into proper position in column 9 instead of the first register as would otherwise be the case if no stop block 114 were in position at this point to block swinging of the arm 110. Continuing from column 9 through column 12, successive items are entered into the machine and it is automatically tabulated to bring the carriage to these successive columnar positions. In the form shown, registers $R_4$, $R_5$, and $R_6$ are successively indexed into position by means of suitable pawls 36 secured at the necessary positions along bar 37.

Upon entering column 13 it is desired to accumulate the items in $R_2$ register and accordingly another pawl 80ᶜ is positioned on the carriage frame just prior to column 13 which restores the register frame. The restoration is limited, however, by a stop block 114ᵃ to bring register $R_2$ into active position. After a transaction has been entered in column 13 the machine is given a stroke of operation to enter an amount in column 14 and in register $R_3$.

If it is desirable to make additional entries in intermediate columns prior to returning the paper carriage to column 1 position, the present invention so provides. In the illustrated form entries are made in columns 9, 10, 11, and 12 (second line of items in Fig. 9) with the carriage moving to the left. This calls for a partial return of the paper carriage to column 9 instead of column 1 but a full return of the register frame to $R_1$ register position. For this purpose the usual marginal block and stop block 120, 121 are employed to control a partial return of the paper carriage. It is also necessary to employ a release pawl 80 which is indicated on the Fig. 9 form at 80$^d$, turned to normal position as shown in Fig. 8, to return the register frame to No. 1 register position. The machine is then operated and items entered to cause them to be printed in successive columns 9, 10, 11, and 12. It will be noted, however, that upon these successive tabulations upon the second trip of the carriage registers R$_1$, R$_2$, R$_3$, and R$_4$ are indexed into position instead of registers R$_3$, R$_4$, R$_5$ and R$_6$ which moved into active position upon this first travel of the carriage across these columnar positions.

After the second transaction has been completed in column 12 the carriage is again returned through the usual marginal release mechanism but is stopped in column 7 by a block 120$^a$ and the register frame is also restored by pawl 80$^c$ but only to R$_3$ position because of stop block 114$^b$. After the second entry is made in column 7 and the sixth in R$_3$ the carriage is returned to column 4 where it is stopped by a block 120$^b$, the register restored by pawl 80$^f$ and limited to R$_2$ position by block 114$^c$. Following the second entry in column 4 and the fourth in R$_2$, the carriage is returned to initial column 1 position and the register frame is restored to R$_1$ by pawl 80$^g$. A new form sheet may then be placed into the machine and the series of operations repeated, or a second series of items may be entered on the present sheet.

It follows from the foregoing description that the present machine provides for an automatic variable selection of registers which selection can be the same or different in successive tabulations of the paper carriage regardless of the direction of travel of the paper carriage and/or the register frame. Furthermore, the register frame can be returned fully or partially to initial or any intermediate position during successive tabulations of the carriage and regardless of the carriage position.

It will be obvious to those skilled in the art that the illustrated machine is one embodiment only of this invention, and furthermore, that various changes may be made in materials and construction without departing from the spirit and scope of this invention as defined in the appended claims.

I claim:

1. In combination, in a calculating machine having a traveling paper carriage, means for tabulating said carriage to different columnar positions, a register frame having a plurality of registers therein selectively movable to active positions at different columnar positions of said paper carriage, mechanism for restoring said register frame to initial position, retractible means normally in the path of said register frame during restoring movement for limiting the restoring movement of said register frame to an intermediate position, and means for preventing retraction of said latter means.

2. In combination, in a calculating machine having a traveling paper carriage, means for tabulating said carriage to different columnar positions, a register frame having a plurality of registers therein selectively movable to active positions at different columnar positions of said paper carriage, mechanism for restoring said register frame to initial position, retractible means normally in the path of said register frame during restoring movement for limiting the restoring movement of said register frame to an intermediate position, and means carried by said carriage for preventing retraction of said latter means.

3. In combination, in a calculating machine having a traveling paper carriage, power means for operating said machine, means for tabulating said carriage to different columnar positions, a movable register frame having a plurality of registers therein selectively movable to different positions at different columnar positions of said paper carriage, means for moving said register support in one direction, normally inoperative means enabled by an element of said power means for moving said register support in the opposite direction, and means controlled by the paper carriage for causing said latter means to be operative.

4. In combination, in a calculating machine having a traveling paper carriage, power means for operating said machine, spring means for tabulating said carriage to different columnar positions, a movable register frame having a plurality of registers therein selectively movable to different positions at different columnar positions of said paper carriage, spring means for moving said register frame in one direction, normally inoperative relatively stronger spring means enabled by an element of said power means for moving said register frame in the opposite direction, and means for selectively controlling said latter register movement.

5. In combination, in a calculating machine having a traveling paper carriage, means for operating said machine, means for tabulating said carriage to different columnar positions, means for returning said carriage to initial position, a movable register frame having a plurality of registers therein selectively movable to different positions at different columnar positions of said paper carriage, means for moving said registers in one direction, and normally inoperative means for moving said registers in the opposite direction, and operative connections between said latter means and an element of said carriage return means for controlling said latter register moving means.

6. In combination, in a calculating machine having a traveling paper carriage, means for operating said machine, means for tabulating said carriage in different columnar positions, a register frame having a plurality of registers therein selectively movable to different positions at different columnar positions of said paper carriage, means for urging said register support in one direction, relatively stronger means for urging said register support in the opposite direction, means for normally latching said stronger means in inoperative position, and operative means between said latching means and an element of said operating means for controlling said latch.

7. In combination, in a calculating machine having a traveling paper carriage, means for operating said machine, means for tabulating said carriage in different columnar positions, a register frame having a plurality of registers therein selectively movable to different positions at different columnar positions of said paper carriage, means for urging said register support in one direction, relatively stronger means for urging said register support in the opposite direction, means for normally latching said latter means in inoperative position, and operative means between said latching means and an element of said operating means for controlling said latch, said operative means being controlled by said paper carriage.

8. In combination, in a calculating machine having a traveling paper carriage, power means for operating said machine, means for tabulating said carriage to different columnar positions, a movable register frame having a plurality of registers therein selectively movable to different positions at different columnar positions of said paper carriage, means for moving said register frame in one direction, means enabled by an element of said power means for moving said register frame in the opposite direction, and latching means for said latter means, said latching means being controlled by said paper carriage.

9. In combination, in a calculating machine having a traveling paper carriage, power means for returning said carriage to different columnar positions, a movable register frame having a plurality of registers therein selectively movable to different positions at different columnar positions of said paper carriage, means for moving said register frame in two directions to present a selected register in active position, means for latching one of said register moving means, and operative connections between an element of said power means and said latching means for operating the latter.

10. In combination, in a calculating machine having a traveling paper carriage, means for operating said machine, means for tabulating said carriage to different columnar positions, a movable register frame having a plurality of registers therein selectively movable to different positions at different columnar positions of said paper carriage, means for moving said register in one direction, normally inoperative means for moving said registers in the opposite direction, operative connections between said latter means and an element of said operating means including a latch for controlling said latter register moving means, and means for controlling said operative connection from said paper carriage.

11. A calculating machine having a motor operated driving means, a traveling paper carriage, a multiple register support carrying a plurality of registers, power means for moving said support in a given direction, restraining means normally restraining said power means, normally disconnected driving connections between said motor driving means and said restraining means, and means controlled by said paper carriage for enabling said driving connections whereby said motor driving means will release said restraining means to permit the power means to move said multiple register support.

12. In combination, in a calculating machine having a traveling paper carriage, means for tabulating said carriage to different columnar positions, a longitudinally movable register frame having a plurality of registers therein movable under control of said carriage to present a selected register to active position at different columnar positions of said paper carriage, and mechanism operable automatically to restore said register frame during either tabulating or return movements of said paper carriage, said mechanism comprising release pawls secured to said carriage for movement therewith.

13. A calculating machine having a traveling paper carriage movable across the machine from column to column as the machine is given cycles of operation, a multiple register support carrying a plurality of registers, said support being movable to different indexed positions, means for moving said register support to different indexed positions in one direction as said carriage moves from column to column across the machine, automatic means for returning said register support in the opposite direction, and means controlled by said carriage for automatically indexing said multiple register support to different positions during its return movement.

14. A calculating machine having a traveling paper carriage movable from column to column across the machine as the latter is given cycles of operation, a multiple register support carrying a plurality of registers, said support being movable from a normal position to different indexed positions, means for moving said support to successive indexed positions in a direction away from the normal to thereby bring successive registers to active position as said carriage tabulates from column to column across the machine, and automatic means controlled by said paper carriage during a predetermined tabulating movement for returning said register support to a predetermined indexed position toward normal whereby, during the succeeding tabulating movements of said carriage, a different series of registers will be indexed in the succeeding columns than if said register support had not been so returned.

15. A calculating machine having a traveling paper carriage movable from column to column across the machine as the latter is given cycles of operation, a multiple register support carrying a plurality of registers, said support being movable from a normal to different indexed positions, means for moving said support to successive indexed positions in a direction away from normal, to thereby bring successive registers to active position as said carriage tabulates from column to column across the machine, means for automatically returning said paper carriage across the machine to a predetermined columnar position, and automatic means controlled by said paper carriage for returning said multiple register support toward normal and indexing the same in a position determined by the carriage but differing from the indexed position occupied by said support during the tabulating movement of said carriage to said predetermined column.

16. A calculating machine having a motor operated driving means, a traveling paper carriage, a multiple register support carrying a plurality of registers, spring means operable to move said register support in a given direction, a latch for restraining said spring means, driving connections including a clutch between said motor operated driving means and said latch, and means controlled by said carriage for engaging said clutch in a predetermined columnar position of said carriage to cause said motor driving means to release said latch to thereby enable said spring to move said register support to a predetermined position.

17. In combination, in a calculating machine having a plurality of registers adapted to be selectively moved to active position, a traveling paper carriage, means for operating said machine, means automatically operable upon machine operations involving movement of said paper carriage for moving said registers to index a given register to active position in a predetermined columnar position of the carriage for one entry in said column while said carriage is being tabulated and to index another of said registers to active position for a second entry in said column while said carriage is being tabulated a second time following a return thereof, and means automatically engaged as an incident to the movement of the paper carriage during said operations of said machine for controlling said register moving means.

18. In combination, in a calculating machine having a plurality of registers adapted to be selectively moved to active position, a traveling paper carriage, means for operating said machine, means automatically operable upon machine operations involving movement of said paper carriage for moving said registers to index a given register to active position in a predetermined columnar position of the carriage for one entry in said column while said carriage is being tabulated and to index another of said registers to active position for a second entry in said column while said carriage is being tabulated a second time following a partial return of the carriage, and means automatically engaged as an incident to the movement of the paper carriage during said operations of said machine for controlling said register moving means.

19. In combination, in a calculating machine having a plurality of registers adapted to be selectively moved to active position, a traveling paper carriage, means for operating said machine, means automatically operable upon movement of said paper carriage for moving said registers to index a given register to active position in a predetermined columnar position of the carriage for one entry in said column while said carriage is being tabulated and to index another of said registers to active position for a second entry in said column while said carriage is being tabulated a second time following a return thereof, and means carried by said carriage for controlling the register moving means.

20. In combination, in a calculating machine having a plurality of registers adapted to be selectively moved to active position, a traveling paper carriage, means for operating said machine, means automatically operable upon movement of said paper carriage for moving said registers to index a given register to active position in a predetermined columnar position of the carriage for one entry in said column while said carriage is being tabulated and to index another of said registers to active position for a second entry in said column while said carriage is being tabulated a second time following a partial return, and means carried by said carriage for controlling the register moving means.

21. In combination, in a calculating machine having a plurality of registers adapted to be selectively moved to active position, a traveling paper carriage, means for operating said machine, means automatically operable upon operations of said machine involving paper carriage movements for moving said registers to index a given register to active position in a predetermined columnar position of the carriage for an entry in said column while said carriage is being moved in one direction and to index another of said registers to active position for a second entry in said column while said carriage is being moved in either direction, and pre-settable means automatically engaged as an incident to movement of said paper carriage during said operations of said machine for controlling said register moving means.

22. In combination, in a calculating machine, power means for operating said machine, a traveling paper carriage, means for tabulating said carriage to different columnar positions, a longitudinally movable register frame having a plurality of registers therein movable to present a given register to active position at different columnar positions of said paper carriage, means automatically enabled by elements of said operating means upon operations of said power machine involving carriage movements for moving a different register into active position upon a second entry in the same columnar position of said carriage following an entry in another columnar position, and means operated as an incident to carriage movement for controlling said moving means.

23. A calculating machine having amount determining differential mechanism, a traveling paper carriage adapted to be tabulated across the machine in one direction and to be returned in the opposite direction to predetermined positions, a plurality of registers adapted to be selectively rendered active with respect to said differential mechanism, register selecting means operable automatically to select said registers in a predetermined sequence as said carriage is tabulated across the machine, means for returning said carriage to a predetermined position from which it is again tabulated across the machine, and means operating automatically upon said return of said carriage for causing said selecting means to select said registers in a different sequence for the second tabulation of said carriage across the machine.

24. A calculating machine having a traveling paper carriage movable across the machine from column to column in tabulating direction and returnable in the opposite direction, amount determining differential mechanism, a plurality of registers carried by a movable register support, power means operable to move said support from a normal position to indexed positions, means automatically indexing said support as said carriage moves from column to column, power means operated as an incident to carriage movement for returning said register support toward normal, and means acting automatically when said carriage reaches a predetermined columnar position in its movement in tabulating direction for causing said register support returning means to partially return said support.

25. A calculating machine having amount determining differential mechanism, power means for operating said machine, a traveling paper carriage adapted to be tabulated across the machine in one direction and to be returned in the opposite direction to predetermined positions, a plurality of registers adapted to be selectively rendered active with respect to said differential mechanism, register moving means operating automatically to render active predetermined registers for predetermined columnar positions of said carriage as the latter is tabulated across the machine, and means operating automatically upon the return of said carriage to a predetermined column to render active a register other than the one rendered active in said column when the carriage was tabulated across the machine, said last means being controlled by an element of said power means.

26. A calculating machine having amount determining mechanism, power means for operating said machine, a traveling paper carriage adapted to be tabulated across the machine in one direction and to be returned in the opposite direction, a plurality of registers carried by a movable support, means for moving said support from a normal position to indexed positions, register moving means operating automatically to index said support so that predetermined registers are rendered active for predetermined columnar positions of said carriage as the latter is tabulated across the machine, and means operating automatically upon the return of said carriage to a predetermined columnar position to return said register support to a predetermined indexed position other than the position it occupied in said columnar position of said carriage when the latter was tabulated across the machine to render active a register other than the one rendered active in said column when the carriage was tabulated across the machine, said last means being controlled by an element of said power means.

27. In combination, in a calculating machine, means for operating said machine, a traveling paper carriage, means for tabulating said carriage to different columnar positions, a register support, a plurality of movable registers therein, means for moving said registers to present a given register to active position at different columnar positions of said paper carriage, and additional means automatically operable upon operations of said machine as an incident to movement of said paper carriage and enabled by an element of said operating means for restoring said registers during either tabulating or return movements of said paper carriage.

28. In combination, in a calculating machine, means for operating said machine, a traveling paper carriage, means for tabulating said carriage to different columnar positions, a register support, a plurality of movable registers therein, means for moving said support to present a given register to active position at different columnar positions of said paper carriage, and additional means automatically operable upon either tabulating or return movement of said paper carriage and enabled by an element of said operating means for restoring said support to predetermined partially returned positions.

29. In combination, in a calculating machine having a traveling paper carriage, means for tabulating said carriage to different columnar positions, a plurality of registers selectively movable to active positions at different columnar positions of said paper carriage, means normally urging said registers in one direction, means for stepping the registers to successive positions in said direction, a second means for returning said registers in the opposite direction, means for selectively limiting the return movement of said register, and means actuated as an incident to the movement of said carriage for returning and controlling said limiting means.

30. In combination, in a calculating machine having a traveling paper carriage, means for tabulating said carriage to different columnar positions, a plurality of registers selectively movable to active positions at different columnar positions of said paper carriage, means normally urging said registers in one direction, means for controlling the movement of the registers to different positions in said direction, a second means for returning said registers in the opposite direction, means for selectively limiting the return movement of said register, and means controlled by said carriage for controlling said returning and selecting means.

31. In combination, in a calculating machine having a traveling paper carriage, means for tabulating said carriage to different columnar positions, means for returning said carriage to initial position, a movable register frame having a plurality of registers therein selectively movable to different positions at different columnar positions of said paper carriage, means for moving said register frame in one direction, means for restoring the register frame, means for latching said register frame restoring means against movement, and operative connections between an element of said paper carriage return means and said latching means for operating the latter, said operative connections being controlled by said paper carriage.

32. In combination, in a calculating machine having a traveling paper carriage and a plurality of registers, means for entering amounts in said registers, said registers being selectively movable to active positions with respect to said means, means for operating said machine, means automatically operable upon movement of said paper carriage as the machine performs a series of operations to index a given register into active position in a predetermined columnar position of the paper carriage for one entry in a given column when said carriage moves in one direction and to index another of said registers into active position for a second entry in said given column when the carriage moves in the opposite direction, and means automatically engaged during movement of said carriage for controlling said register indexing means.

33. In combination, in a calculating machine having a paper carriage and a plurality of registers, means for entering amounts in said registers, said registers being selectively movable to active positions with respect to said means, power means for operating said machine, moving means automatically operable upon a series of machine operations in which said paper carriage is moved to different columnar positions to move a given register into active position in a predetermined columnar position of the paper carriage for one entry in a given column and to move another of said registers into active position for a second entry in said given column following an entry or entries with said carriage in other columnar positions, and means automatically enabled by an element of said power means during and responsive to movement of the paper carriage for controlling said moving means.

34. In combination, in a calculating machine, means for operating said machine, a traveling paper carriage, means for tabulating said carriage to different columnar positions, a register support, a plurality of movable registers therein, means for moving said support to present a given register to active position at different columnar positions of said paper carriage, and additional means automatically operable upon either tabulating or return movement of said paper carriage and enabled by an element of said operating means for restoring said register support to predetermined partially returned positions, said last means being controlled by said carriage.

35. A calculating machine having an amount determining differential mechanism, a traveling paper carriage adapted to be tabulated across the machine in one direction and to be returned in the opposite direction, a plurality of registers adapted to be selectively rendered active with respect to said differential mechanism, register selecting means operating automatically to select a predetermined register in accordance with the columnar position of said carriage when said position is reached by the movement of said carriage in tabulating direction, and means operating automatically to select another of said registers in accordance with said columnar position of the carriage when said position is reached by movement of the carriage in the opposite direction.

36. In combination, in a calculating machine having a traveling paper carriage and a plurality of registers, means for entering amounts in said registers, said registers being selectively rendered active with respect to said means, means for operating said machine, means automatically operable upon movement of said paper carriage as the machine performs a series of operations to select a given register for operation in a predetermined columnar position of the paper carriage for one entry in a given column when said carriage enters the column from one direction and to select another of said registers for a second entry in said given column when the carriage enters the column from the opposite direction, and means automatically engaged during movement of said carriage for controlling said register selecting means.

ROBERT L. MULLER.